United States Patent Office 3,182,104
Patented May 4, 1965

3,182,104
PROCESS FOR MAKING THICK-SKINNED ARTICLES COMPRISING POLYURETHANE FOAM
Lester L. Cwik, Chicago, Ill., assignor to The Glidden Company, Cleveland, Ohio, a corporation of Ohio
Filed Feb. 14, 1962, Ser. No. 173,127
8 Claims. (Cl. 264—45)

This invention relates to a process for producing foamed molded articles and more particularly to the preparation of thick-skilled foamed polyurethane products of essentially unbroken continuous exterior surfaces.

The process of the invention provides for the manufacture of accurately and faithfully molded statues, statuettes, and containers and for enveloping and forming attractive, novelty decanters, buckets, vases, and other decorative and serviceable products. The process provides a means for producing articles having at least a portion composed of an essentially continuous, dense exterior polyurethane surface and foamed interiors, optionally with cores containing serviceable holders, containers, reinforcements, or other materials.

Broadly, the invention comprises as a first aspect forming a terminally foamable polyurethane mixture capable of foaming into a final porous structure, the mixture comprising a polyisocyanate, an active hydrogen-containing organic substance capable of forming polyurethane plastics with the polyisocyanate, and a blowing agent or a combination of several blowing agents. The mixture can be a creamy, homogeneous fluid, or a pre-expanded froth, but must be capable of forming a foam having a free blow density from about 2 to 8 pounds per cubic foot. However, before terminal foaming, the invention comprises passing a quantity of the mixture into a totally enclosing mold, such quantity of mixture being sufficient on terminal foaming for exerting a positive pressure on all mold surfaces of about 8–35 pounds per square inch gauge, permitting foaming and curing of the mixture, and, after terminal foaming has subsided, removing from the mold a molded, foamed article having an essentially continuous, dense exterior surface with faithful pattern delineation and a foamed interior structure.

Another aspect of the invention comprises the formation of hollow polyurethane plastic statutes and the like and the formation of objects whose surfaces are at least partially shrink-fitted with polyurethane foam. An example of the latter is a bottle. The mold matrix can be formed with a projecting core to form hollow objects, or the mold surfaces may be in engagement with objects around or on which the polyurethane plastic will be foamed.

Figure 1:
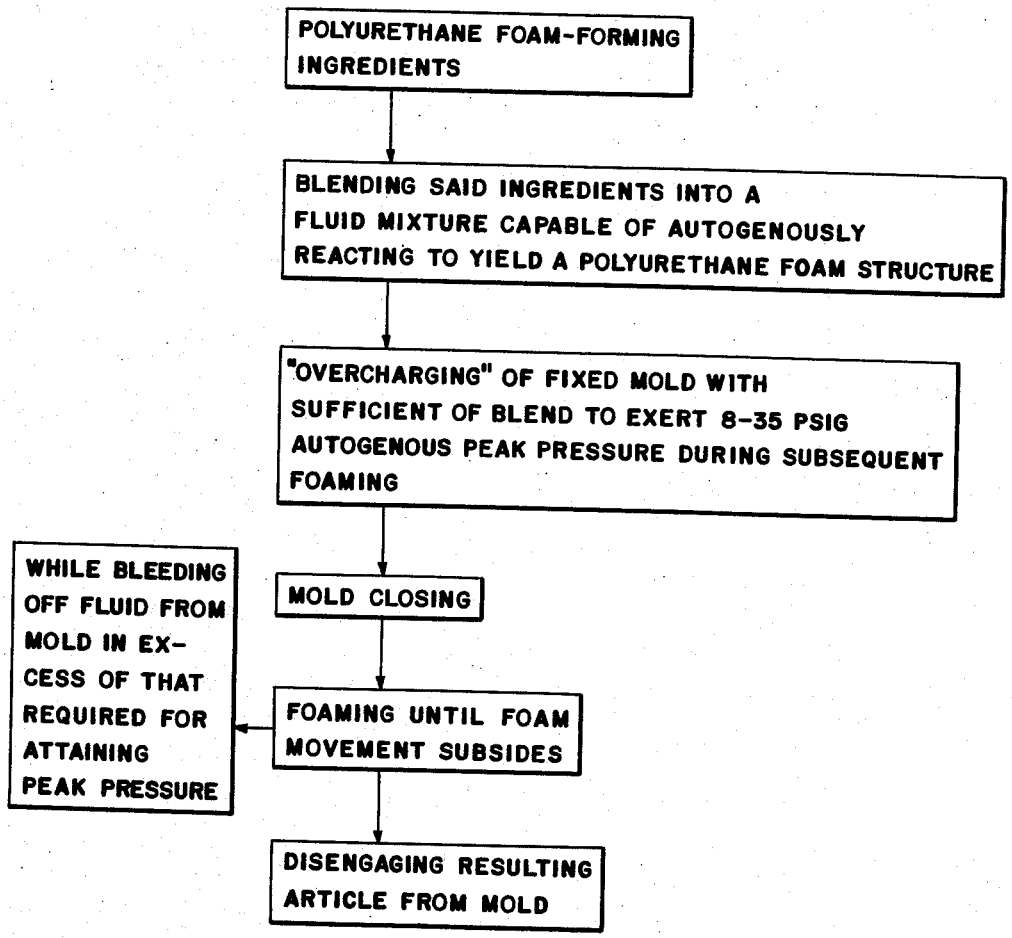
Figure 2:
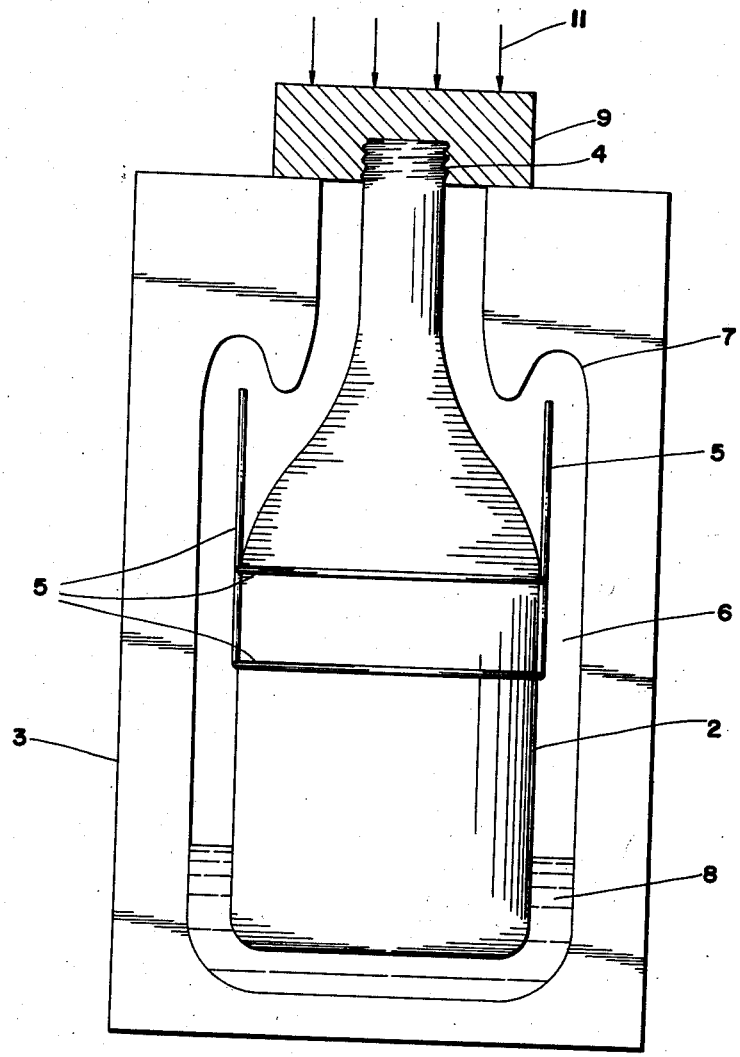

FIGURE 1 describes diagrammatically the broad process of this invention. FIGURE 2 shows in cross-sectional elevation a bottle and mold section represented according to invention principles. This figure will be described in detail hereinafter in connection with the example.

In preparing the foamable polyurethane cream or froth the formulator may use either the "semi-prepolymer" or the "one-shot" technique. The "semi-prepolymer" process requires the total reaction polyisocyanate to be premixed with less than all of the active hydrogen containing organic compounds and reacted together into a "prepolymer" mix at a time prior to the addition of the remaining formulary ingredients. The "one-shot" process calls for simultaneously mixing together and reacting the total ingredients of the formula. With either technique it is possible to make a homogeneous mixture of foamable ingredients having a creamy consistency or a partially expanded heterogeneous froth.

The polyurethane plastics formed in the mold by terminal foaming can be rigid, semi-rigid or flexible. In this connection the spectrum of suitable organic compounds which have reactive hydrogen atoms ranges down to those of small hydrogen content yielding little polymer cross linkage and hence the more flexible foams, on up to those compounds of greater active hydrogen content that can produce the semi-rigid or rigid foams.

Thus in preparing the homogeneous cream or heterogeneous froth, both of which are contemplated as being suitable as a first aspect of this process, the active hydrogen containing organic compounds include various types such as the glycols, polyols, and hydroxyl-rich polyesters, as well as the numerous ether glycols. These can be used individually or in combination to produce the creamy or frothy mixture. Thiols and related sulfur compounds also can be used. Examples of polyols include glycerols, pentaerythritol and trimethylol ethane, and examples of glycols include ethylene and diethylene glycol, dipropylene glycol, butylene glycol, and 2-ethyl hexanediol-1,3. Polyethylene glycol adipate is an example of a suitable polyester, but alkyd condensation products of dibasic carboxylic acids such as adipic, azelaic, pimelic, glutaric, sebacic, succinic, or phthalic with glycols or mixtures thereof, such as ethylene glycol, triethylene glycol, propylene glycol, or 1-4-butanediol will make a suitable polyester. Examples of suitable polyether glycols include polytrimethylene ether glycol, polytetramethylene ether glycol, polyethylene ether glycol, polypropylene ether glycol, polyneopentylene ether glycol and polypentamethyl ether glycol.

In considering the foam types or formulating techniques to be used, it is an element of the inventive process that the mixture be capable of generating a foam under atmospheric pressure that has a density ranging from about 2–8 pounds per cubic foot. However, this does not preclude the cream or froth from being formed in accordance with other practices known to those skilled in the polyurethane art and generally thought of as being conventional. Such practices include compounding the final plastics with other materials such as the conventional light screening agents, catalysts, and cell size controllers or surfactants.

The various light screening agents may be mixed in the creamy or frothy mass to preserve the fine appearance of finished products even after continued exposure to light. They include phenyl salicylate, 2(2-hydroxy,5-methylphenol) benzotriazol, 2,4-dibenzoyl resorcinol, and 2-hydroxy,4-methoxy benzophenone. The foam or froth forming controllers or surfactants include the conventional silicone oils or the polyglycol-silicone polymers. Examples of reaction catalysts are n-methylmorpholine, tetramethyl butanediamine, triethylenediamine, stannous octoate and dibutyl tin dilaurate.

In line with the conventional compounding of the various foam types, water addition is often useful because water combines with the isocyanate group to form an amine which will react with isocyanate to produce a urea. The urea reacts in a polymer cross linking manner with additional isocyanate to form biuret bridges that give additional structural rigidity. This addition can be constructive in forming rigid or semi-rigid articles of the inventive process. Furthermore, structural rigidity can be obtained by using a trifunctional isocyanate. Representative triisocyanates compatible in the agitated cream or froth include 4,4,4'-triisocyanate triphenylmethane and 2,4,6-triisocyanate toluene.

However, any reactive isocyanate having two or more isocyanate groups is suitable for the foamable polyurethane system. Examples of these difunctional isocyanates include tolylene-2,4-diisocyanate, triphenyl diisocyanate, ethylene diisocyanate, p-phenylene diisocyanate, hexamethylene diisocyanate, 1,4-tetramethylene diisocyanate, meta xylylene diisocyanate, chlorophenyl-2,4-diisocyanate, naphthalene-1,5-diisocyanate, dianisidine diisocyanate, and 3,3'-dimethyl-4,4'-biphenylene diisocyanate.

In carrying out this invention the final products may be treated on their exterior surfaces with conventional surface decorative or protective coatings such as paint. Additionally, in the formulating of the foamable cream or froth various conventional fillers may be added to the batch as desired. These include clay, talc, Wollastonite, mica, sand, diatomaceous silica, and fuller's earth.

The polyurethane plastics may be colored or tinted by pigment concentrates, pigments in oil, organic and inorganic pigment types, or fluorescent and "black-light" types. The article also may be given a marbleized appearance as indicated by the invention described in my copending patent application Serial No. 173,120, filed on even date herewith (I-726). Pigments which are either substantially inert toward the foamable mixture or that can be rendered sufficiently inert toward the foamable mixture by being coated with unreactive and insoluble resins, lacquers, or similar protective coatings, include: titanium dioxide, zinc oxide, leaded zinc oxide, white lead, lithopone, barium sulfate, alumina, ferric oxide, tan oxide of iron, burnt sienna, raw and burnt umber, chrome oxide green, phthalocyanine green, ultramarine blue, carbon black, toluidine red, parachlor red, cadmium reds and yellows, chrome yellow, chrome orange, Hansa yellow, elemental metal powders and vacuum metalized pigments. These pigments can be added directly to the mixture or mixed first in a reactive vehicle such as a hydroxyl-bearing compound, and then added.

In the practice of the invention foaming of the reactants is handled by conventional blowing agents dissolved in the foamable mixture or by adding water to such mixture. When water is added carbon dioxide for foaming will result from the reaction of water with either an isocyanate or a urethane linkage of a semi-prepolymer mix. When the reactants are stage-foamed, that is, made to pass through one or more frothing or even foaming stages, a first stage halogenated propellant such as dichlorodifluoromethane can be used to pre-expand the reactants to a fugitive froth. Then a higher boiling residual frothing agent present in the primary froth can be made to escape and give a second frothing stage, if desired. Terminal foaming to final foam structure is done by retained or extraneously added blowing agent. When water addition with consequent carbon dioxide evolution has been used as a stage foamer, dichlorodifluoromethane may be used in conjunction with the frothed mixture to form a final foam. Otherwise, these blowing agents or other conventional halogenated foaming agents such as trifluoromonochloromethane and trichloromonofluoromethane may be used alone in the single stage "creaming" techniques that produce final foams through just one foaming operation from a mixture resembling cream rather than froth in consistency.

The ultimate free blow density of foam from a particular foamable mixture is measured by mixing together simply the chemical ingredients, including frothing and blowing agents, catalysts, and surfactants, into an unadulterated foamable polyurethane plastic (exclusive of pigments, fillers, stains, dyes or other similar foreign ingredients) to form a 200 gram sample, the mixing being performed either by hand or by a mechanical mixer for about 10-20 seconds at 77° F., then pouring the mixed foamable ingredients into a paper gallon container (a No. 10 paper cup which is approximately 7 inches in diameter and 10 inches high) and allowing the mixture to reach terminal foaming and cure against atmospheric pressure from the open top of the container. After cure is effected and movement has ceased, a cube of foamed polyurethane, 2 inches on a side, is cut from the center of the resulting foamed specimen and weighed. From the cube weight the ultimate free blow density of the foam is derived by conventional calculations.

The free blow density of the foam can be regulated in a number of ways well known in the polyurethane art. The main factor is selection of and proportioning of the blowing agent or agents. Raising the proportion of particular blowing agent tends to give lower density foam and vice versa. The more volatile the blowing agent in general, the lower density of the foam and vice versa. Other factors ordinarily giving less pronounced effect include selection of the reactive ingredients, fillers, catalysts, and surfactants, and their concentration in a particular foamable polyurethane mixture. Temperature control, particularly that involving obtaining or suppressing crosslinking of the mixture in the plastic stage before substantial formation, introduction, or volatilization of the blowing agent, is also a way of regulating ultimate free blow density, as is well known in the art.

Operating with a foamable composition of ultimate free blow density substantially below about 2 pounds per cubic foot usually gives an article which is overly friable for general utility. Conversely, operating with a foamable mixture giving a free blow density substantially above about 8 pounds per cubic foot adds substantial cost to the operation without sufficient compensating gain in the strength and desirable finishing characteristics of artistic articles to which this invention is substantially directed. For efficiency and economy, molding is conducted using a foamable mixture having an ultimate free blow density of about 3-7 pounds per cubic foot. After the pressure molding operation, the resulting foam will have a somewhat higher density than that ultimate free blow density, e.g., 10-40% greater.

If the molding pressure is substantially below about 8 p.s.i.g., too much pattern delineation and skin formation are sacrificed, and removal of flash lines, etc., is likely to expose significant bubbles that will show on the surface, particularly after abrasive smoothing along such lines. The use of pressure substantially above about 35 p.s.i.g., while feasible, is less economic than is operation in the pressure range called for and, like the use of extremely high free blow density foams, tends to yield, on a urethane use basis, expensive objects which have comparatively poor insulation value, where such is desired, and require specially reinforced molds that further add to the overall expense of the process.

In molding, an enclosing mold is used and is "overcharged" with compounded foamable mixture. Thus, more froth or cream is poured into the mold than would normally be sufficient to just fill the whole mold cavity with generated foam under the usual condition of atmospheric pressure. Since it is necessary that there be a peak positive pressure exerted in the total mold cavity of about 8-35 p.s.i.g. during the foaming period, and advantageously about 10-25 p.s.i.g., overcharging of the mold must be carried out accurately to meet these specifications most economically. However, control of the mold pressure build-up can be aided by a small "bleeder" means (back pressure control relief exit) during the terminal foaming operation.

I have found that this pressure regulation produces a final article from which extraneous protuberances such as flash lines, sprues, and runners may be removed and, if desired, the article abrasively finished at the lines and points of their removal without substantially exposing bubble holes on the exterior surface of the article. Additionally, the entire exterior surface of the finished article has an attractive, essentially continuous skin that can be easily painted, lacquered, or finished by other conventional applications. The foamed portion of the resulting product has sufficient mechanical strength to resist a fair amount of rough handling or exposure without damage. The mold pressure will produce an article of detailed delineation and fine demarcation, and make it possible to form consistently on a production basis products of intricate and delicate configurations with ease and economy.

In its broadest scope the invention also comprehends the manufacture of novel containers and decanters as well as "solid foam" core objects, which because of their light weight, are not only economical, but also quite serviceable. Thus, the mold can be constructed so that terminal foaming will produce an article of a hollow rather than foamed core. The cream or froth can be poured into such mold and expanded around internal objects such as weights, rods, wire, connectors, hinges and reinforcing webbing. The finished molded articles will thus at least partially contain these objects for balancing, weighting, connecting, strengthening, etc., the final product.

Similarly, the mold can be so constructed that prior to foaming there can be inserted in the mold or engaged as a portion of the mold surface or matrix an object such as a decanter or bottle around which the foam can generate. When such foaming produces a pressure within the range of about 8–35 p.s.i.g., these bottles or jars are shrink-fitted by the normal slight contraction of the final foam to form serviceable articles with desirable insulation characteristics that have virtually unitary construction without special adhesive bonding. Additionally, when the mold is disengaged and the article removed, there is, on the foamed portion of the container a faithfully molded polyurethane structure which can have attractive appearance. The container will be accurately and faithfully molded and be immediately useful except for a minor finishing operation to remove flash lines and the like.

The following example shows how the invention has been practiced, but should not be construed as limiting the invention. All parts herein are parts by weight, except where otherwise expressly indicated.

Example

A screw-top beverage bottle, 2, was placed in mold, 3, so that screw threads, 4, projected from the top. The mold resembled an intricate carving of a Nubian head with a tall topknot. A reinforcing wire loop, 5, projected upwardly in mold cavity, 6, from the body of the bottle on each side of the bottle neck into tall symmetrical ear-like mold sections, 7. The bottle was centered in the mold cavity to receive an approximately one-inch foam coating on all parts except the projecting bottle threads, which were exposed, and the wire loops were somewhat more thinly-coated, but were to be completely enveloped in foam.

A creamy, foamable mixture for generating a structurally rigid polyurethane foam was made by agitating vigorously together 1,000 parts of the prepolymer reaction product of a mixture of 80% 2, 4-tolylene diisocyanate and 20% 2,6-tolylene diiisocyanate with sorbitol polyether, the polyether having hydroxyl number of 190, viscosity at 25° C. (Hoeppler) of 7,500–10,000 centipoises, acid number of 0.5, and weight per gallon at 25° C. of 9.1 pounds, the prepolymer having 22.63 weight percent of sorbitol polyether in its composition, and 863 parts of the following mixture: 750 parts of sorbitol polyether as described above, 10 parts of dimethyl polysiloxane oil having viscosity of 900 centistokes at 25° C. and specific gravity at 25° C. of 1.03, 100 parts of liquid trichloromonofluoromethane, and 3 parts of triethylene diamine.

The free blow density of this particular mixture was 5.4 pounds per cubic foot. However, the trichloromonofluoromethane blowing agent, which was about 5.3 weight percent of the total reactive ingredients, could, if desired, be varied within the range of about 3–10 weight percent to produce a terminal polyurethane foam having an ultimate free blow density between about 2 and about 8 pounds per cubic foot.

The creamy, foamable polyurethane mixture, 8, was then poured into the annulus between the mold base and the bottle. The mold was then closed with cover, 9, adapted to receive snugly the projecting screw threads at the top of the bottle and protect them from contact with the foam, and this cover was then weighted as indicated by force lines, 11. The quantity of foamable mixture used was sufficient to generate on foaming a maximum of about 15 p.s.i.g. pressure on all mold surfaces. Vapor leakage through the screw threads and a fluid bleeder from the mold, not shown, remove sufficient fluids from the mold to thus limit the peak pressure therein.

After about 15 minutes, movement of the foam had subsided, whereupon the cover was lifted and the mold opened. The resulting container, having a bottle as a core and the foam shrunk-fit around its entire surface area excepting the small screw-top portion, was freely removed. Actual foam density, because of the pressure molding, was about 7.2 pounds per cubic foot. The flash lines, etc., remaining at the junctures of the mold, were broken off and the lines and points remaining from their removal were abrasively finished, thereby leaving an essentially continuous surface with no significant or unsightly exposed bubbles or pinhole formations. The container surface accurately and faithfully reproduced the mold pattern.

The container was next painted brown, and, after the paint had dried, the bottle was partially filled with fluid and capped. It was dropped from a height of about 4–5 feet several times on a hard floor surface. There resulted no visible damage to the container or its contents. The container was considered a finished product ready for use.

What I claim is:

1. A process for making an article comprising polyurethane foam which comprises:
    (A) blending a polyurethane mixture having an ultimate free blow density from about 2 to 8 pounds per cubic foot, said mixture being capable of subsequently foaming into a final porous structure, said mixture comprising a polyisocyanate, an active hydrogen-containing organic substance capable of forming a polyurethane structure with said polyisocyanate, and a blowing agent;
    (B) charging a fixed volume mold cavity with a quantity of said mixture in excess of that normally adequate to fill the whole mold cavity with foam generated against atmospheric pressure, said quantity charged being sufficient for exerting an autogenous peak pressure of about 8–35 p.s.i.g. in the mold cavity during subsequent foaming of said mixture;
    (C) closing the mold cavity;
    (D) permitting said mixture therein to foam until movement of the foam subsides while bleeding off fluid from the mold cavity that is in excess of that required for attaining said peak positive pressure;
    (E) disengaging the resulting article from said mold cavity.

2. The process according to claim 1 wherein said foamable mixture has an ultimate free blow density of about 3–7 pounds per cubic foot and is charged to the mold in the creaming stage.

3. The process according to claim 1 wherein said foamable mixture has an ultimate free blow density of about 3–7 pounds per cubic foot and is charged to the mold in the frothing stage.

4. The process according to claim 1 wherein said foamable mixture produces a substantially rigid urethane foam, and said peak positive pressure is about 10–25 p.s.i.g.

5. The process according to claim 1 wherein the mold contains a core structure.

6. The process according to claim 5 wherein said core structure is integral with the mold.

7. The process according to claim 5 wherein said core structure is detachable from the mold and is engaged in shrink fit by the resulting foam structure.

8. The process of claim 7 wherein said core structure is a bottle.

(References on following page)

References Cited by the Examiner

UNITED STATES PATENTS

| | | | |
|---|---|---|---|
| 2,769,205 | 11/56 | Pfleumer | 18—53 |
| 2,770,241 | 11/56 | Winkler. | |
| 2,958,907 | 11/60 | Mumford et al. | 18—48 |
| 2,977,014 | 3/61 | Kock | 215—12 |
| 2,981,984 | 5/61 | Orr | 18—59 |
| 2,991,896 | 7/61 | Glover et al. | 215—12 |
| 3,002,640 | 10/61 | Kline. | |
| 3,003,192 | 10/61 | Pfleumer | 18—53 |
| 3,006,033 | 10/61 | Knox | 18—48 |
| 3,012,284 | 12/61 | Touhey | 18—48 |
| 3,037,652 | 6/62 | Wallace | 18—59 XR |
| 3,068,532 | 12/62 | Higgins | 18—59 |
| 3,095,337 | 6/63 | Chase | 18—48 |

FOREIGN PATENTS

| | | |
|---|---|---|
| 582,122 | 8/59 | Canada. |

OTHER REFERENCES

Monsanto publication, "Isocyanate Foamed-in-place resins," No. 1–144, revised Feb. 1, 1953, all pages.

Du Pont booklet, Elastomer Chemicals Department, HR–26, "Rigid Urethane Foams — II Chemistry and Formulation," April 1958, pp. 38–44.

Du Pont booklet, Elastomer Chemicals Department, HR–31, "Freon"—Blown Rigid Foams, July 1958, all pages.

Rubber World, "Molding of prepolymer based resilient urethane foam," vol. 139, No. 5, February 1959, pp. 685–692.

Plastics Engineering Handbook, 3rd. ed. N.Y., Reinhold, 1960, pp. 184–188.

ALEXANDER H. BRODMERKEL, *Primary Examiner.*

WILLIAM J. STEPHENSON, *Examiner.*